(12) United States Patent
Goff et al.

(10) Patent No.: US 8,185,610 B2
(45) Date of Patent: May 22, 2012

(54) METHOD FOR CLIENT-SIDE AGGREGATION OF ASYNCHRONOUS, CONTEXT-SENSITIVE REQUEST OPERATIONS FOR JAVA SERVER PAGES (JSP)

(75) Inventors: Robert E. Goff, Cary, NC (US); Scott D. Johnson, Durham, NC (US); Erinn E. Koonce, Durham, NC (US); Todd E. Kaplinger, Raleigh, NC (US); Stephen J. Kenna, Morrisville, NC (US); Maxim A. Moldenhauer, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1197 days.

(21) Appl. No.: 11/950,017

(22) Filed: Dec. 4, 2007

(65) Prior Publication Data
US 2009/0144707 A1    Jun. 4, 2009

(51) Int. Cl.
G06F 15/16    (2006.01)
(52) U.S. Cl. ...................................... 709/219
(58) Field of Classification Search .................. 709/219
See application file for complete search history.

(56) References Cited

U.S. PATENT DOCUMENTS

| | | | |
|---|---|---|---|
| 6,351,771 B1* | 2/2002 | Craddock et al. | 709/227 |
| 6,370,552 B1* | 4/2002 | Bloomfield | 715/234 |
| 7,058,944 B1* | 6/2006 | Sponheim et al. | 718/100 |
| 2002/0103830 A1* | 8/2002 | Hamaide et al. | 707/513 |
| 2005/0027869 A1* | 2/2005 | Johnson | 709/227 |
| 2006/0168139 A1* | 7/2006 | Messinger et al. | 709/219 |

OTHER PUBLICATIONS

Jellema, Ajax-based Post Loading of resources in HTML pages—for reuse of resources and fast user feedback, Weblog for the Amis Technology corner (Jan. 30, 2006).*
Jellema, HTML Post Loading Resources Framework (AJAX Based)—Part 2—Loading and pasting simple content, Weblog for the Amis Technology corner (Jan. 31, 2006).*
Armstrong, et al., The J2EE 1.4 Tutorial, Sun Microsystems, pp. 10, 83, 454, 457, 460-461, 477, 493-495 (Dec. 7, 2005).*
Goetz, Java theory and practice: Good housekeeping practices, IBM (Mar. 21, 2006).*
WebSphere Application Server for OS/400: Developing and deploying applications, p. 1040, IBM (2005).*

(Continued)

*Primary Examiner* — Wei Zhen
*Assistant Examiner* — Kevin Dothager
(74) *Attorney, Agent, or Firm* — Yudell Isidore Ng Russell PLLC

(57) ABSTRACT

A method, system, and computer program product for efficiently fulfilling java server page (JSP) requests for dynamic web content, in a computer network system. An asynchronous processing (AP) utility pre-defines a number of custom classes to enable the asynchronous processing of requests. A JSP which contains a custom "async:include" tag indicates an asynchronous request for dynamic content. When a set of asynchronous requests are received by an application server, an "AsyncRequestDispatcher" is called to handle the asynchronous processing of each associated request dispatcher include fragment. For each fragment, a separate request thread is initiated. A placeholder corresponding to each "async:include" request is written to a servlet response buffer. HyperText Markup Language (HTML) content, which includes the placeholders, and a number of javascripts are then written to the client browser. The original thread is closed. The Javascripts enable the retrieval of all response fragments which replace the corresponding placeholders.

9 Claims, 8 Drawing Sheets

OTHER PUBLICATIONS

Ziebold, et al., Aynchronous Rendering of Portlet Content with Ajax Technology, Oracle (Jun. 6, 2005).*

Murray, G., Asynchronous JavaScript Technology and XML (AJAX) With the Java Platform, Oracle (Jun. 9, 2005).*

Acoustic, Incremental Page Display Pattern for User Controls, CodeProject (Oct. 30, 2007).*

Stengel, J., Delayed Content Loading Using the AJAX.NET Timer and UpdatePanel, CodeProject (Oct. 26, 2007).*

Prosise, J., Asynchronous Pages in ASP.NET 2.0, MSDN (Oct. 2005).*

Prosise, J., Scalable Apps with Asynchronous Programming in ASP. NET, MSDN (Mar. 2007).*

* cited by examiner

METHOD FOR CLIENT-SIDE AGGREGATION OF ASYNCHRONOUS, CONTEXT-SENSITIVE REQUEST OPERATIONS FOR JAVA SERVER PAGES (JSP)

BACKGROUND

1. Technical Field

The present invention generally relates to data processing systems and in particular to web content acquisition in data processing (network) systems.

2. Description of the Related Art

Java Server Pages (JSPs) are an extension to the servlet programming model. One of the key design features of JSP technology is the manner in which a JSP container buffers response content before writing the content to the underlying Servlet response writer. A web container is not able to detect what has been written for a particular JSP until the JSP buffer is filled or the JSP writer is explicitly flushed. When the JSP buffer is filled or the JSP writer is explicitly flushed, the output is written to the underlying Servlet response writer and an associated buffering layer. Only at this point is a web container aware of the content.

In an application server architecture, requests may be made for resources. For example, JSPs may be used to request resources using a Uniform Resource Locator (URL). These resources often comprise a set of operations to be performed, such as includes or forwards to other resources. Generally, only a few of these operations are particularly time consuming, but due to the synchronous nature of the request lifecycle, these operations have a major affect on throughput as a whole.

Potential solutions include utilizing frames or server side includes (SSI), where each portion of the page is a separate distinct request from the client. There is a limitation in these approaches since these distinct requests are unable to be associated with each other and share context related to the original request. The idea of sharing context among all these requests is highly desired because the operations called by the request need access to the original request information sent by the client or set in the processing before the dispatch. Other potential solutions which attempt to overcome the inability to share context suffer from the limitation of synchronized access for each of the fragmented requests. The current methodologies that provide shared context require the server or the proxy to be responsible for aggregating the results of these operations. The aggregation of the results requires additional memory and request processing resources. In addition, holding onto the entire response output until the aggregation is complete prevents the client from ideally starting to retrieve response output as soon as possible. Another downside is the fact that the response output normally written to the client is using up memory while the request thread is left waiting for the other asynchronous actions to complete.

SUMMARY OF ILLUSTRATIVE EMBODIMENTS

Disclosed are a method, system, and computer program product for efficiently fulfilling asynchronous Java Server Page (JSP) requests for dynamic web content in a computer network system. An asynchronous processing (AP) utility pre-defines a number of custom classes to enable the asynchronous processing of requests. A JSP which contains a custom "async:include" tag indicates an asynchronous request for dynamic content. When a set of asynchronous requests are received by an application server, an "AsyncRequestDispatcher" is called to handle the asynchronous processing of each associated request dispatcher include fragment. For each fragment, a separate request thread is initiated. A placeholder corresponding to each "async:include" request is written to a servlet response buffer. The server creates JavaScript for each placeholder and then sends an initial response to the client containing the JavaScript, terminating the original execution thread. The Javascript enables the client to retrieve include fragments which replace the corresponding placeholders.

The above as well as additional objectives, features, and advantages of the present invention will become apparent in the following detailed description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
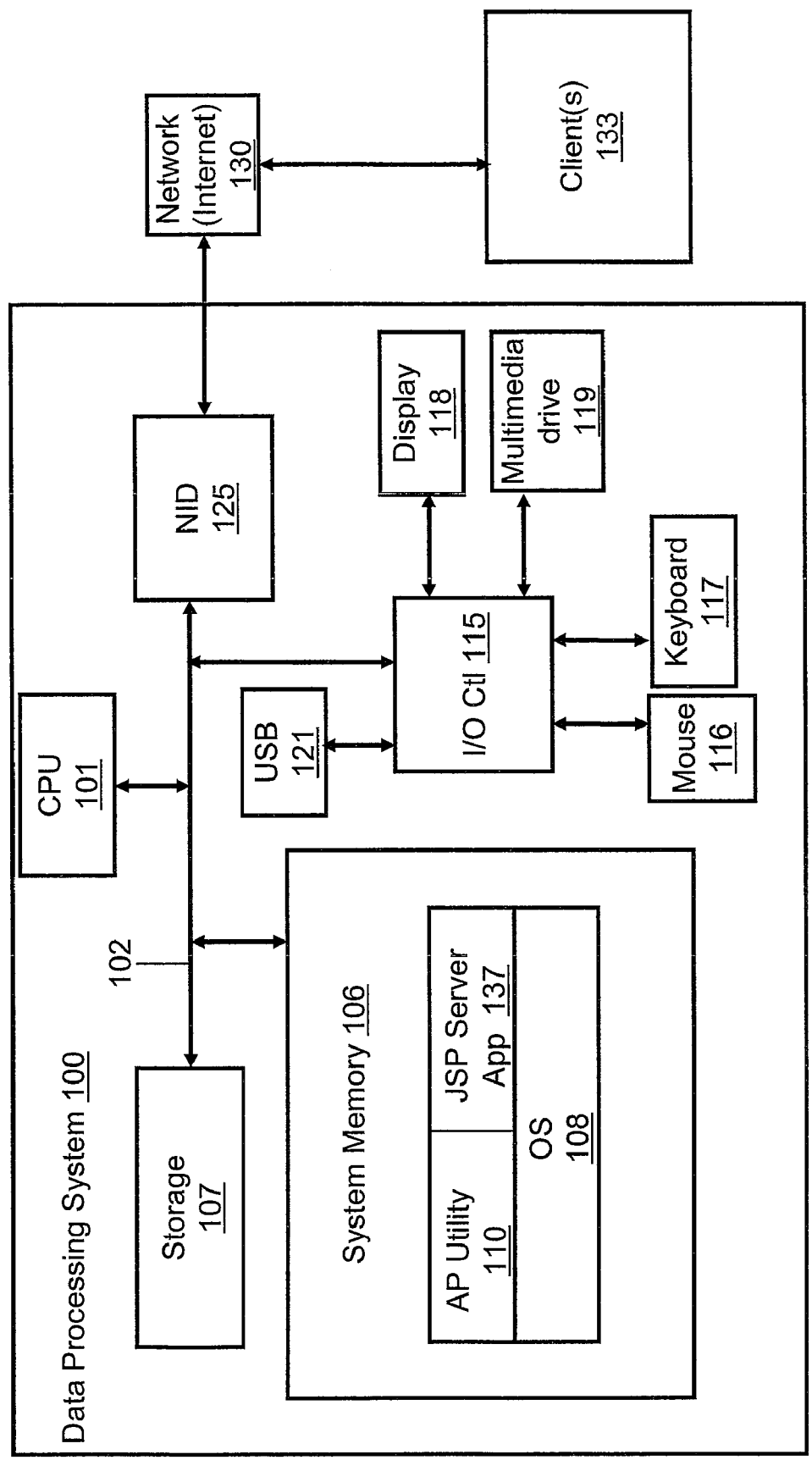
FIG. 1 is a block diagram representation of a data processing system, according to one embodiment of the invention.

Disclosed are a method, system, and computer program product for efficiently fulfilling asynchronous Java Server Page (JSP) requests for dynamic web content in a computer network system. An asynchronous processing (AP) utility pre-defines a number of custom classes to enable the asynchronous processing of requests. A JSP which contains a custom "async:include" tag indicates an asynchronous request for dynamic content. When a set of asynchronous requests are received by an application server, an "AsyncRequestDispatcher" is called to handle the asynchronous processing of each associated request dispatcher include fragment. For each fragment, a separate request thread is initiated. A placeholder corresponding to each "async:include" request is written to a servlet response buffer. The server creates JavaScript for each placeholder and then sends an initial response to the client containing the JavaScript, terminating the original execution thread. The Javascript enables the client to retrieve include fragments which replace the corresponding placeholders.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

With reference now to FIG. 1, there is depicted a block diagram representation of a data processing system (DPS) (and connected network). DPS 100 comprises at least one processor or central processing unit (CPU) 101 connected to system memory 106 via system interconnect/bus 102. Also connected to system bus 102 is I/O controller 115, which provides connectivity and control for input devices, of which pointing device (or mouse) 116 and keyboard 117 are illustrated, and output devices, of which display 118 is illustrated. Additionally, a multimedia drive 119 (e.g., CDRW or DVD drive) and USB (universal serial bus) hub 121 are illustrated, coupled to I/O controller. Multimedia drive 119 and USB hub 121 may operate as both input and output (storage) mechanisms. DPS 100 also comprises storage 107, within which data/instructions/code may be stored.

DPS 100 is also illustrated with a network interface device (NID) 125, with which DPS 100 connects to one or more clients 133 via access network 130, such as the Internet. In particular, DPS 100 may represent an application server which receives requests for dynamic web content from client 133. In the described embodiments, network 130 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within memory 106 or other storage (e.g., storage 107) and executed by CPU 101. Thus, illustrated within memory 106 are a number of software/firmware components, including operating system (OS) 108 (e.g., Microsoft Windows®, a trademark of Microsoft Corp, or GNU®/Linux®, registered trademarks of the Free Software Foundation and The Linux Mark Institute), JSP server application software 137, and asynchronous processing (AP) utility 110. In actual implementation, JSP server application software 137 and AP utility 110 may be combined as a single application collectively providing the various functions of each individual software component when the corresponding code is executed by the CPU 101. For simplicity, AP utility 110 is illustrated and described as a stand alone or separate software/firmware component, which provides specific functions, as described below.

CPU 101 executes AP utility 110 as well as OS 108, which supports the user interface features of AP utility 110. In the illustrative embodiment, AP utility 110 generates/provides several graphical user interfaces (GUI) to enable user interaction with, or manipulation of, the functional features of the utility (110). Among the software code/instructions provided by AP utility 110, and which are specific to the invention, are: (a) code for predefining a number of custom java classes to enable the asynchronous processing of requests; (b) code for invoking an "async:include" action, corresponding to the "async include" tag; and (c) code for triggering a series of steps to efficiently enable the asynchronous processing of requests for dynamic content. For simplicity of the description, the collective body of code that enables these various features is referred to herein as AP utility 110. According to the illustrative embodiment, when CPU 101 executes AP utility 110, DPS 100 initiates a series of functional processes that enable the above functional features as well as additional features/functionality, which are described below within the description of FIGS. 2-3, and 5-7.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
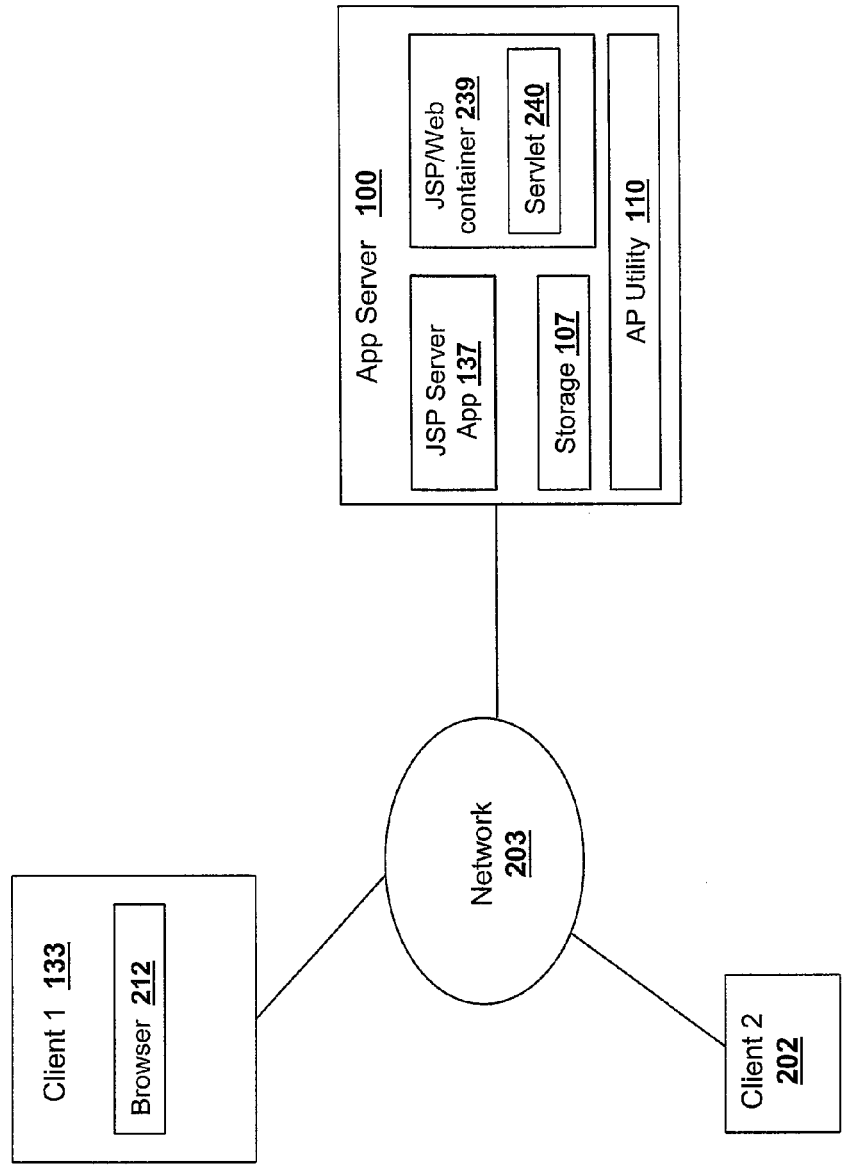
FIG. 2 illustrates a network in which a client's request for dynamic content is received by an application server that generates JSPs to facilitate the processing of requests, according to one embodiment.

With reference now to FIG. 2, a network, in which a client's request for dynamic content received by an application server that generates JSPs to facilitate the processing of requests, is illustrated, according to an illustrative embodiment of the present invention. Network 200 comprises client 1 133 and client 2 202 which both connect to network A 203. Client 1 133 comprises browser 212. Also connected to network A 203 is application server 100. Application server 100 comprises AP utility 110, JSP server application software 137, servlet 240 located within web container 239, and storage 107.

An application server needs a JSP container to process JSP pages. Similarly, a web server (not explicitly shown) uses a servlet container (not explicitly shown) to provide an interface to servlets. The JSP container is responsible for intercepting requests for JSP pages. The JSP container is also responsible, in the request processing phase, for invoking the JSP page implementation class (the generated servlet) to process each request and generate the response. The JSP container is often implemented as a servlet configured to handle all requests for JSP pages. In fact, these two containers, a servlet container and a JSP container, are often combined in one package under the name web container (e.g., web container 239).

Returning to the figure, browser 212 allows a client to make requests for dynamic web content and displays the results of requests (via the execution of a JSP) for web content on browser 212 residing on client 1 133. Requests for dynamic web content by client 1 133 are received by application server 100. Application server 100 generates the JSP(s) corresponding to the request. Furthermore, JSP server application software 137 implements servlet 240 which is utilized to facilitate the processing of the client's request. Application server 100 employs storage system 107 to hold the results of the requests until the results are received by the client (133).

Figure 3:
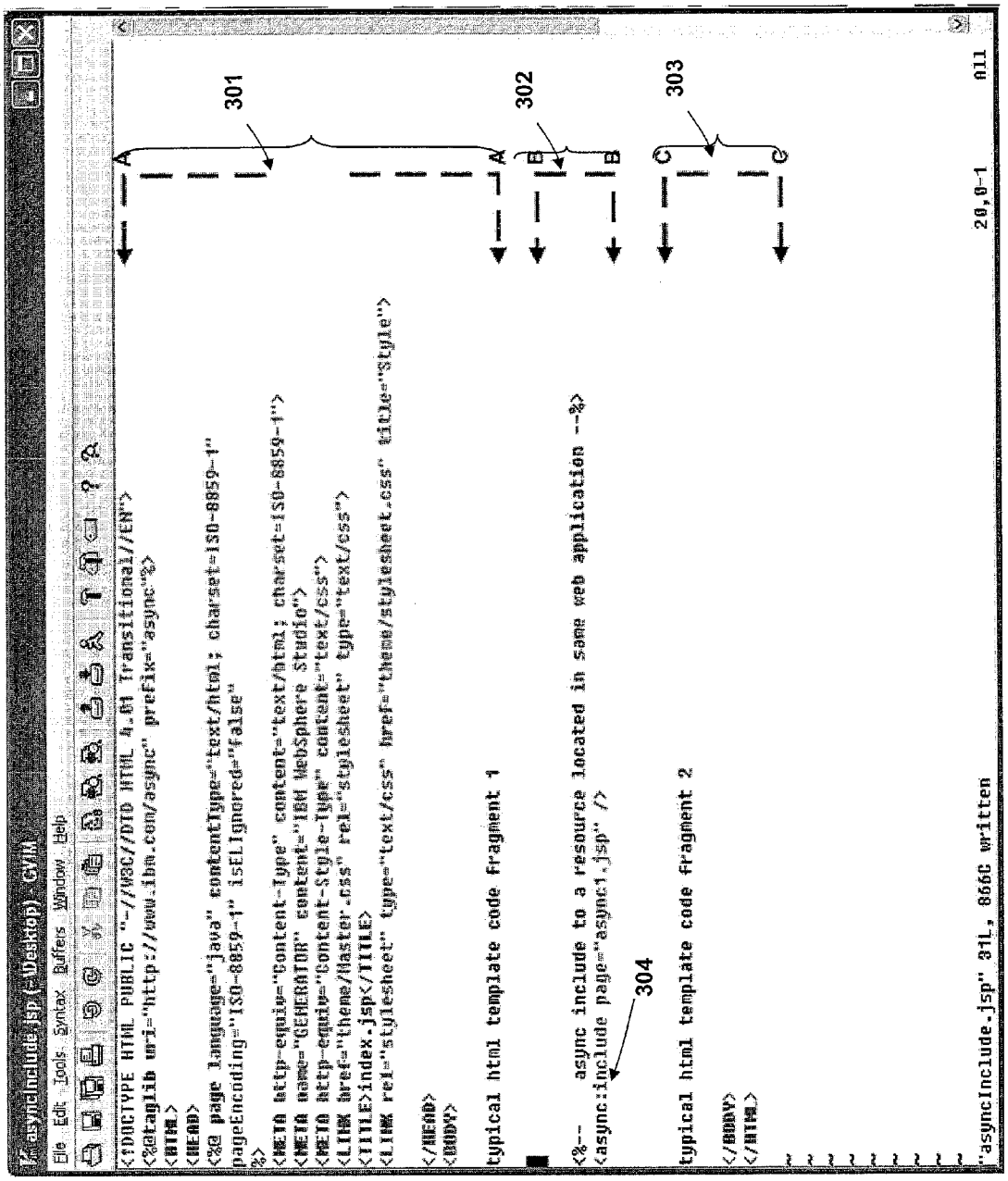
FIG. 3 illustrates a Java Server Page (JSP), according to one embodiment.

FIG. 3 illustrates a Java Server Page (JSP), according to one embodiment of the invention. JSP 300 comprises section A 301, section B 302 and section C 303. Section B 302 of JSP 300 comprises "async:include" tag 304.

In JSP 300, the top portion, section A 301, of the page prior to "async:include" tag 304, is written to the JSP Buffer prior to the "async:include" being executed. The buffer may or may not be automatically flushed by the JSP container, depending on the amount of data the buffer contains (i.e., the amount of data in section A 301).

Section B 302, the bottom portion of the page, is written to the JSP buffer after the "async:include" is called. Section B 302 executes concurrently with the "async:include" request and may complete either before or after the "async:include" request completes. The buffer is automatically flushed by the JSP container because the end of the page has been reached. Therefore, buffers have the ability to flush to the underlying servlet response before the "async:include" action is finished.

In JSP 300, section A 301 and section C 303 represents template text. Section B 302 represents a JSP element which contains "async:include" tag 304. Predefined "async:include" tag 304 is contained within the JSP custom tag library. At execution time, "async:include" tag 304 alerts the runtime of a request for dynamic content and invokes the "Async Request Dispatcher" method. The "Async Request Dispatcher" (ARD) method allows a client to execute an asynchronous include and obtain dynamic web content in an efficient manner.

Figure 4:
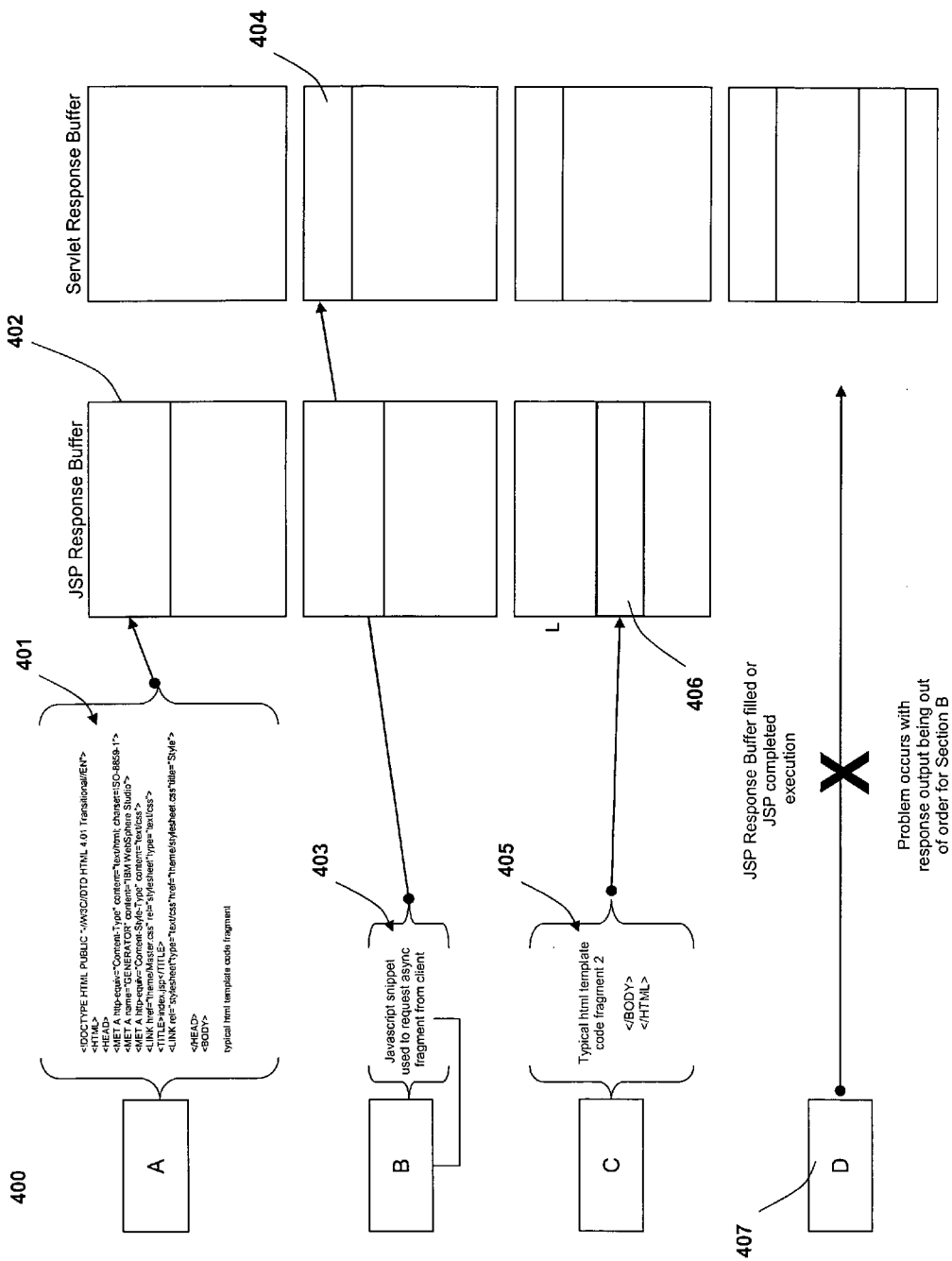
FIG. 4 illustrates the impact of a Java Server Page (JSP) on a JSP buffer, according to the prior art.

FIG. 4 illustrates the impact of a Java Server Page (JSP) on a JSP buffer, according to the prior art. Buffer response 400 comprises template code A 401 and corresponding JSP response 402. Buffer impact 400 also comprises JSP element B 403 and corresponding servlet buffer response 404. Buffer response 400 further comprises template code C 405 and corresponding JSP response 406. Result D 407 is also included in buffer response 400.

Buffer response 400 demonstrates that a web container is unable to properly place the Javascript markup in the correct location of a page when written directly to the underlying servlet response buffer. Thus, the improper placement results in an incorrect response rendering (i.e., an out of order rendering of data). In particular, result D 407 is the result of an asynchronous include tag located in JSP element B 403 that writes responses directly to the servlet response buffer.

Figure 5:
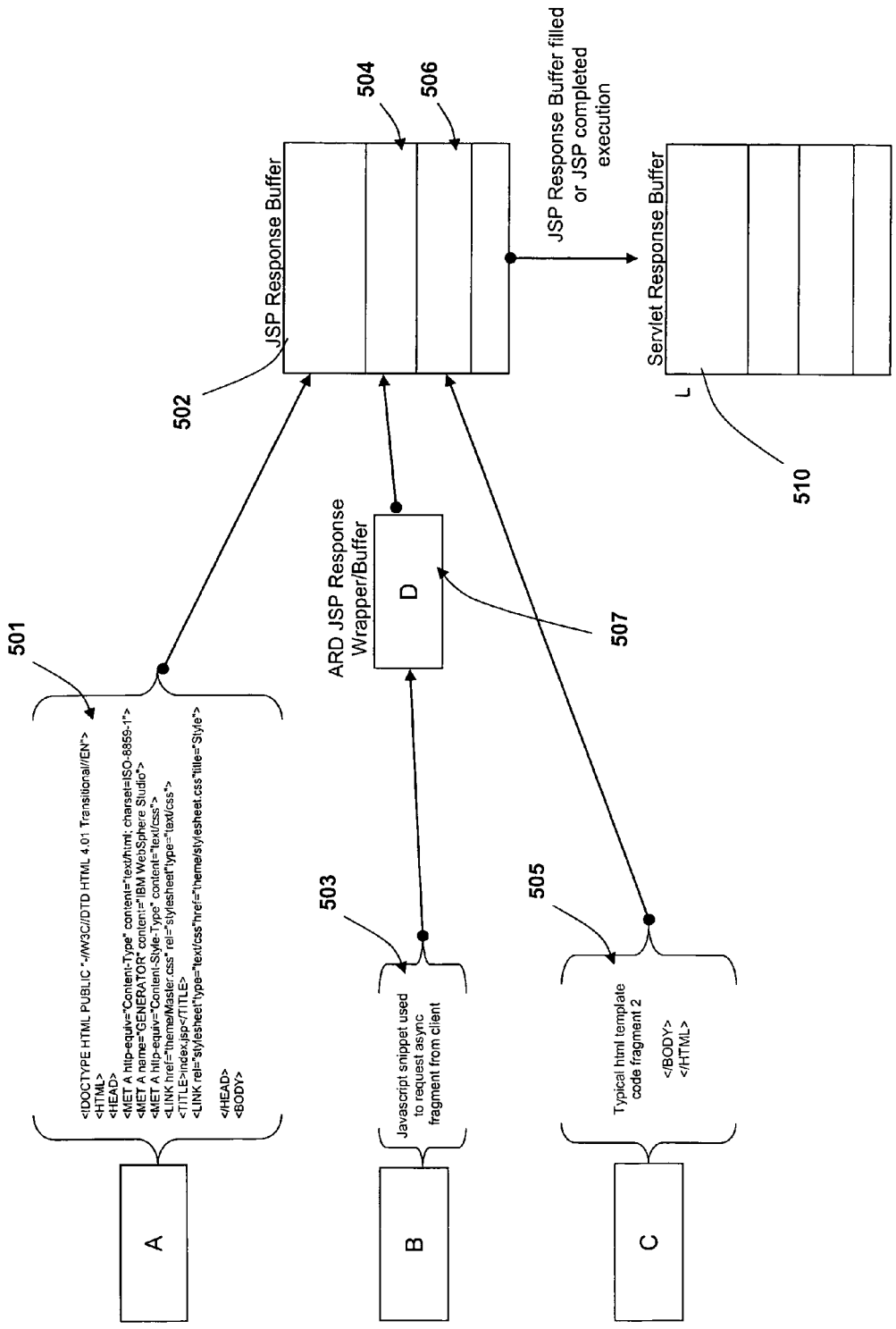
FIG. 5 illustrates the impact of a Java Server Page (JSP) on a JSP buffer, according to one embodiment.

FIG. 5 illustrates the impact of a Java Server Page (JSP) on a JSP buffer, according to one embodiment. Buffer response 500 comprises template code A 501 and corresponding JSP response 502. Buffer response 500 also comprises JSP element B 503 and corresponding JSP response 504. Buffer response 500 further comprises template code C 505 and corresponding JSP response 506. ARD JSP Wrapper Object D 507 is also included in buffer response 500. In particular, ARD JSP Wrapper Object D 507 is the result of an "async:include" tag located in JSP element B 503. Finally, Buffer response 500 comprises servlet response 510.

Buffer response 500 demonstrates that a web container is able to properly place the javascript markup in the correct location of a page. In other words, the web container places JavaScript markers in the response in order to indicate where in the page a particular "async:include" has been invoked. The placeholder is written between template code A 501 and template code C 505 to the JSP buffer (used by template code A 501 and template code C 505). However, JSP element B 503 is written to a custom buffer (illustrated as ARD JSP Wrapper Object D 507), instead of the underlying servlet response buffer. Thus, the proper javascript placement results in a correct response rendering (i.e., an orderly rendering of data), as illustrated by servlet response 510.

In buffer response 500, the custom "async:include" tag is responsible for invoking the "async:include" action via an ARD method. During this stage, the JSP container creates a ServletResponseWrapper object D 507 that overrides the ServletResponse method getwriter and provides a PrintWriter that interacts with the JSP Buffer. By implementing ServletResponseWrapper 507, the ARD is able to write the JavaScript markup (for the async request) directly to the JSP Buffer.

The ServletRequest has methods that provide notification of incoming information such as FORM data, HTTP request headers, and the like. The ServletResponse has methods that allows a user to specify the HTTP response status (200, 404, etc.), response headers (Content-Type, Set-Cookie, etc.), and, most importantly, provides a "PrintWriter" used to send output back to the client. A similar filtering mechanism is used by the ARD to "wrap" the request and the response in order to provide each "async:include" request with a unique 'PrintWriter' and to allow for concurrent execution.

There are many ways for a filter to modify a request or a response. For example, a filter may add an attribute to the request or insert data in the response. A filter that modifies a response usually captures the response before the response is returned to the client by passing a stand-in stream to the servlet that generates the response. The stand-in stream prevents the servlet from closing the original response stream when the original response stream completes and allows the filter to modify the servlet's response. To pass this stand-in stream to the servlet, the filter creates a response wrapper that overrides the getWriter method to return this stand-in stream. Wrapper methods default to calling through to the wrapped request or response object. To override request methods, the request is "wrapped" in an object that extends ServletRequestWrapper (HttpServletRequestWrapper). To override response methods, the response is "wrapped" in an object that extends ServletResponseWrapper (or HttpServletResponseWrapper).

Figure 6:
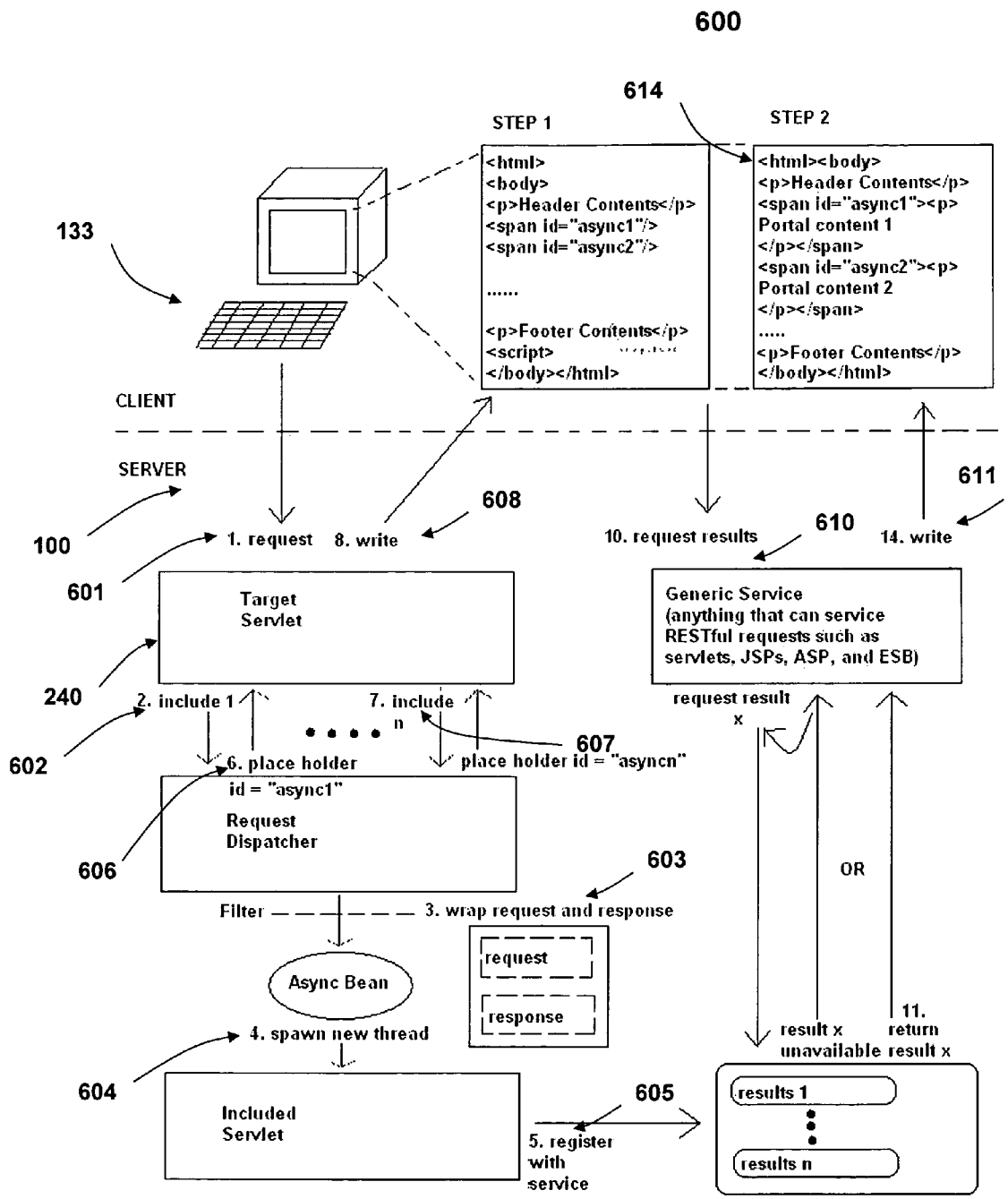
FIG. 6 illustrates the flow of a request for dynamic web content in a network system, based on an "async:include" tag, according to one embodiment.

FIG. 6 illustrates the flow of a request for dynamic web content in a network system, based on an "async:include" tag, according to one embodiment. Network 600 comprises client 133 connected to server 100. Client 133 comprises browser 112 (not explicitly shown in network 600). Server 100 also comprises servlet 240 which calls the "AsyncRequestDispatcher" method.

The following enumerated steps outline the processing structure of the servicing of a request for dynamic content while using an "async:include" tag. Included in the flow of the request servicing with the "async:include" tag are the following steps:

1. 601: Servlet 240 located on application server 100 receives a request issued by client 1 133 using browser 112.
2. 602: The "RequestDispatcher" method, invoked by the "async:include" tag, is called which then calls the custom ARD method.
3. 603: The "ServletFilter" is used to wrap the response(s) to the request(s) via the ServletResponseWrapper class.
4. 604: The "AsyncBeans" starts a new thread with cloned objects.
5. 605: The "async:include" content is registered with the server storage service.
6. 606: A placeholder with an "async:include" identification (id) is written to the original "PrintWriter."
7. 607: Steps 2-6 are repeated for each "async:include" tag.

8 608: The HTML content and a Javascript is written to handle the retrieval of the include fragments.
9 The original client request thread is closed.
10 610: The Javascript on the client browser calls to the server storage service with the "async:include" (id) to attempt the retrieval of each "async:include" response.
11 611: Upon receipt of a "200 Status" code, the results are inserted into the placeholder in the Browser Object Model (BOM) tree in the client's browser.
12 Response fragment(s) is deleted from server store.
13. Steps 10-12 are repeated until all responses are retrieved.
14 614: The client receives properly rendered full response output.

Figure 7A:
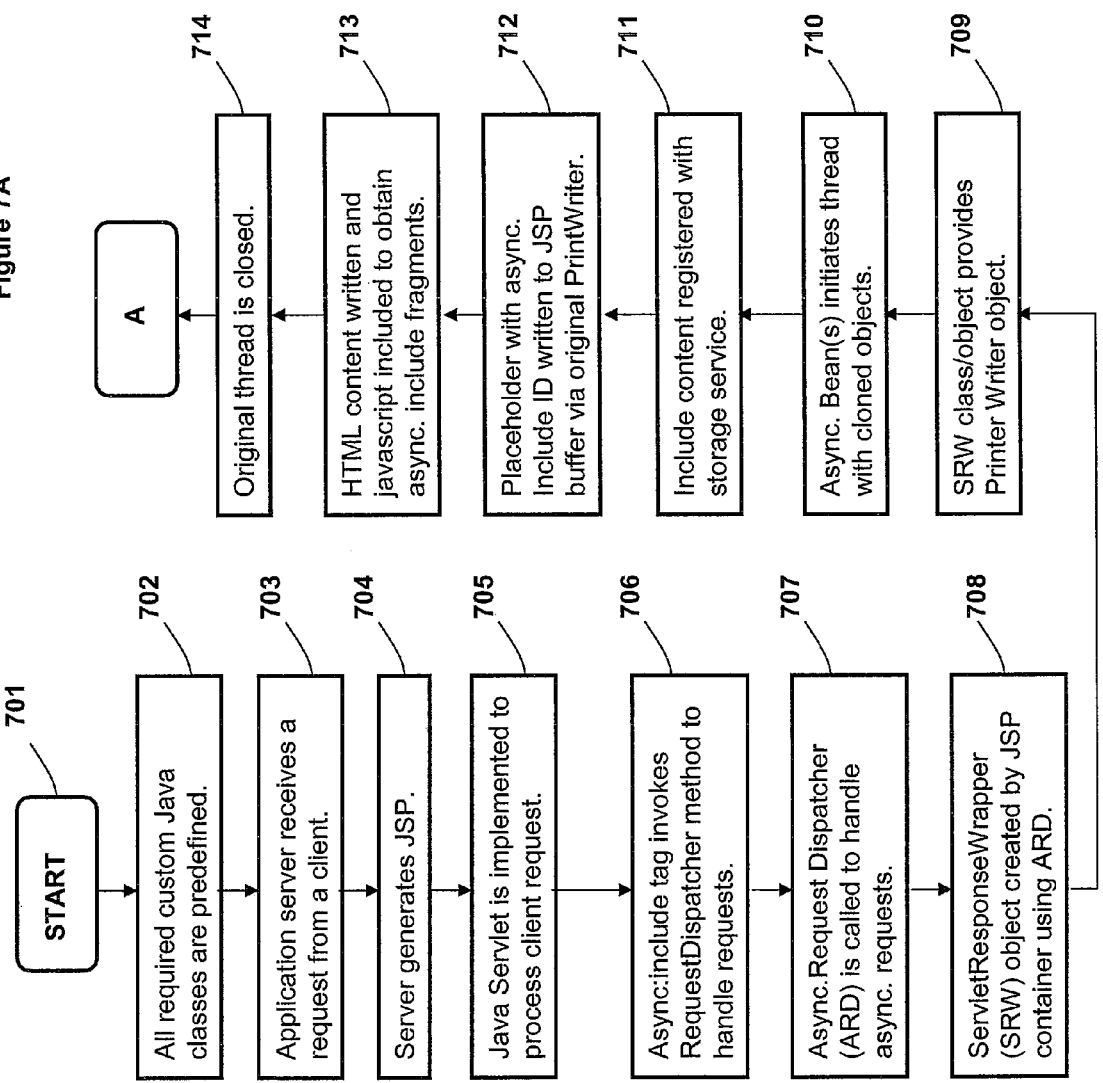
FIG. 7 (FIG. 7A, 7B) constitutes a pair of flow charts illustrating the asynchronous processing of requests for dynamic web content, according to one embodiment.
Figure 7B:
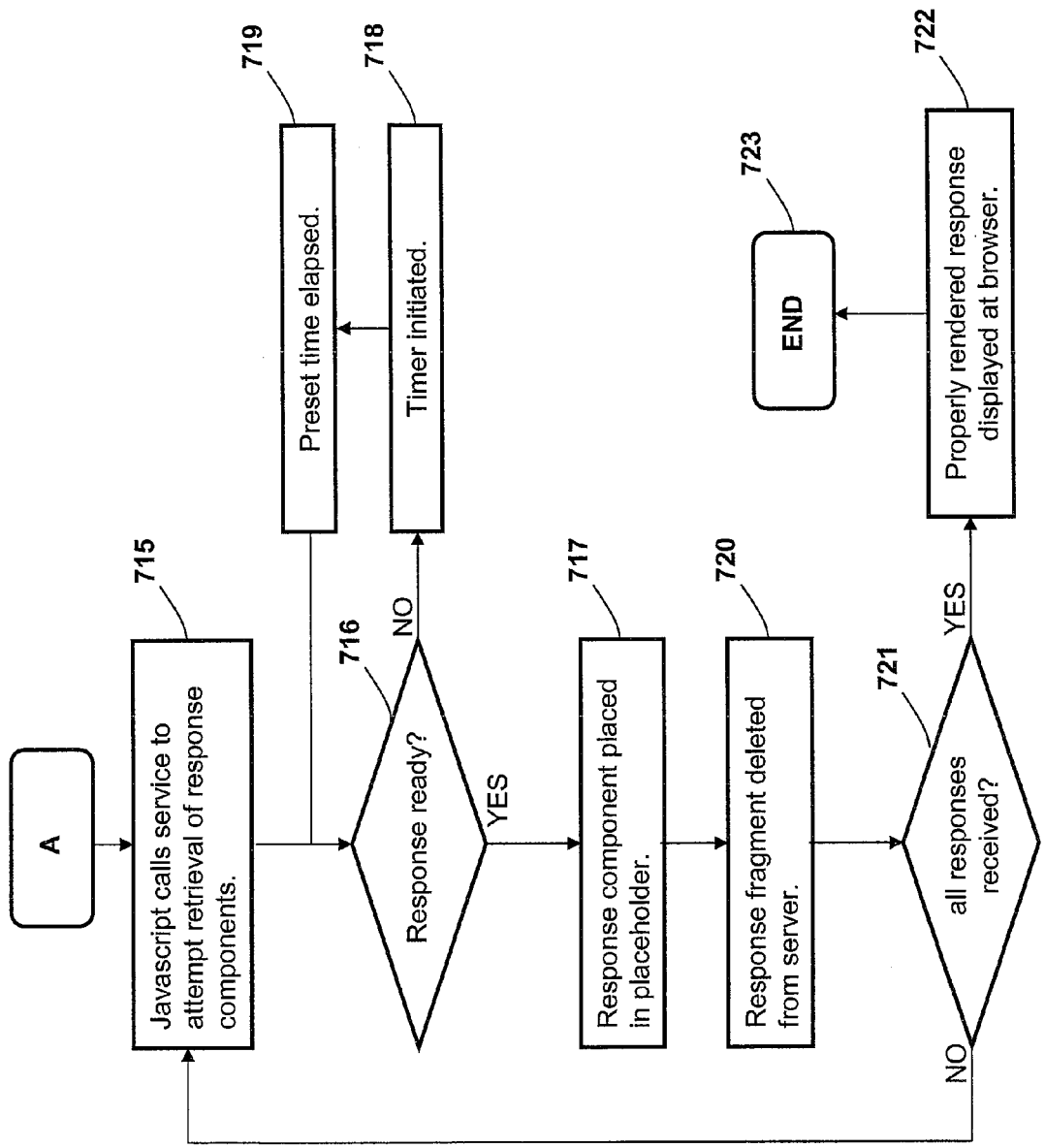

These steps are revisited, expanded and further elaborated upon in the following flow chart of FIG. 7 (FIG. 7A, 7B).

FIG. 7 is a flow chart illustrating a method by which the above processes of the illustrative embodiments are completed. Although the method illustrated in FIG. 7 may be described with reference to components shown in FIGS. 1-3 and 5-6, it should be understood that this is merely for convenience and alternative components and/or configurations thereof can be employed when implementing the various methods. Key portions of the method may be completed by asynchronous processing (AP) utility 110 executing within DPS 100 (FIG. 1 and FIG. 2) and controlling specific operations of/on DPS 100, and the method is thus described from the perspective of either/both AP utility 110 and DPS 100.

The process of FIG. 7 begins at initiator block 701 and proceeds to block 702, at which a number of custom java classes are predefined within the JSP custom tag library. The classes may be predefined by a manual and/or automatic process. Application server 100 receives a client request for dynamic web content, as shown at block 703. Application server 100 initiates the generation of the JSP at block 704. The JSP may contain a number of sections of basic template text. In addition, a JSP custom tag called "async:include" may be utilized/included in one section of the JSP. The "async:include" tag may be used to specify a particular request for dynamic content. At block 705, servlet 240 is implemented to process the request.

At block 706, a 'Request Dispatcher' method is called to handle requests. The Request Dispatcher method then calls/employs an 'Asynchronous Request Dispatcher' (ARD) to handle the asynchronous processing of requests, at block 707.

At block 708, with the aid of the filtering mechanism, a "ServletResponseWrapper" (SRW) object is created by the JSP container, using the ARD. The SRW object overrides the method "getWriter" and provides a "PrinterWriter" object to interact with the JSP buffer, as shown at block 709. The SRW object provides each "async:include" with a unique 'PrintWriter' and enables concurrent execution of requests. Thus, the ARD method is able to write a javascript markup (corresponding to each "async:include" request) to the JSP buffer via the "PrintWriter" object.

The ARD utilizes an asynchronous bean(s) to initiate a request thread, as shown at block 710. The asynchronous bean(s) initiates the request thread using clones/copies of the request object(s). These copies of the request objects (which refer to the request content corresponding to each "async:include" tag) allow the context, for example, request attribute and headers, to be identifiable while allowing each concurrent include to modify the request without the possibility of conflict. An asynchronous bean is a Java object or enterprise bean that may run asynchronously by a Java 2 Platform Enterprise Edition (J2EE) application, using the J2EE context of the asynchronous bean creator. This context may include naming and security contexts. Asynchronous beans may improve performance by enabling a J2EE program to decompose operations into parallel tasks.

At block 711, the content of each "async:include" request is registered with the server side storage service. For each "async:include", a placeholder with an asynchronous include identifier is written to the original 'PrintWriter' object, as shown at block 712.

At block 713, the JSP container writes the response content (including the placeholders) to the client. The inserting of placeholders in the response that represent the results of each asynchronous request is executed according to the Browser Object Model (BOM) representation of response output. The Javascript subsequently enables the client to obtain the "async:include" response fragment content.

The original client request thread is closed, at block 714. The original thread ends since the results are later retrieved by separate client side poll requests.

The process of FIG. 7 continues with the flow chart of FIG. 7B. At block 715, the Javascript, written to the client browser, calls the server storage service with the asynchronous include id to attempt the retrieval of each "async:include" response. At decision block 716, AP utility 110 determines whether a response is ready for transfer to the client browser. If AP utility 110 determines that a response is ready, as indicated by the receipt of an (HTTP) "200 Status" code, the results are inserted into the placeholder in BOM tree of the browser (on client computer system), as shown at block 717. If AP utility 110 determines that a response is not ready, as indicated by the receipt of an (HTTP) "100 Status" code, AP utility 110 initiates a timer, as shown at block 718. At block 719, a preset retry waiting period elapses and the process returns to decision block 716. In another embodiment, instead of the client continually retrying the retrieval of the response fragment, asynchronous input/output (AIO) mechanisms may be used to keep the request open until the response fragment is ready.

After a particular response fragment has been retrieved at the client browser (717), the response fragment, stored on the server, is deleted from memory, as shown at block 720. At decision block 721, AP utility 110 determines whether all responses have been retrieved. If AP utility 110 determines that all responses (i.e., a complete response) have been retrieved, the client receives a full response output which is properly rendered via the browser, as shown at block 722. If AP utility 110 determines that all responses (i.e., a complete response) have not been retrieved, the process returns to block 715, at which, AP utility 110 continues the retrieval of response fragments. Upon receipt of the complete response, the process ends at block 723.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In an application server receiving a request for dynamic web content, a method comprising:
   defining a number of custom Java classes within a class library, wherein said classes allow an asynchronous processing of a number of requests for dynamic web content;
   receiving at the application server, from a client, one or more asynchronous requests for a dynamic web content;
   said application server calling a dispatcher function to handle the asynchronous processing of each associated request dispatcher include fragment;
   initiating a separate request thread for each fragment following receipt of the one or more asynchronous requests;
   generating a Java Server Page (JSP) comprising one or more "async include" tags that indicate that the JSP represents an asynchronous request for the dynamic web content;
   writing, to a servlet response buffer, a placeholder corresponding to each JSP having an "async include" tag;
   creating JavaScript for each placeholder;
   sending an initial response containing the JavaScript to the client;
   terminating an original execution thread;
   triggering a number of further processing actions to facilitate the generation of one or more response fragments; and
   transferring the one or more response fragments to the client in response to receipt from the client of one or more poll requests that are facilitated by the JavaScript contained in each placeholder, wherein the JavaScript enables the client to retrieve include fragments which replace corresponding placeholders.

2. The method of claim 1, wherein said triggering a number of further processing actions further comprises:
   invoking an "async:include" action, corresponding to the "async:include" tag, which provides an "async request dispatcher" (ARD) JSP response wrapper;
   in response to implementing the ARD JSP response wrapper, creating a "PrintWriter" response object, wherein said "PrintWriter" response object allows a number of response fragments to be written directly to the ARD JSP response wrapper;
   initiating a response thread for the one or more "async include" requests corresponding to each one of a plurality of "async include" tags of the JSP, with an aid of one or more asynchronous beans, wherein said asynchronous beans facilitate the propagation of a number of request contexts, which contexts include one or more of, but is not exclusively limited to: (1) a security context; (2) a naming context; and (3) connection context;
   registering a content of each one of a plurality of "async include" requests with an application server storage system;
   activating a translation of the JSP to a Java servlet;
   prompting the execution of the generated Java servlet; and
   writing HTML content to the JSP buffer, including a number of placeholders containing JavaScript respectively corresponding to a number of "async include", wherein said JSP buffer writes to a servlet response buffer; and
   wherein terminating an original execution thread comprises closing the request thread.

3. The method of claim 1, wherein said transferring one or more response fragments to the client further comprises:
   receiving one or more poll requests from the client, wherein said one or more poll requests indicate that the client is ready to receive one or more of a plurality of response fragments returned by the response thread, wherein said one or more poll requests are based on one of the following:
      (1) a poll request to a controller of a server storage service, wherein said poll request is received, at a regular interval, until a response fragment is available; and
      (2) an asynchronous input-output (AIO) mechanism, wherein said AIO mechanism facilitates the transmission of a single poll request for a corresponding response fragment, wherein said AIO mechanism keeps said single poll request open until the corresponding response fragment is available;

in response to each one of a plurality of response fragments being available, submitting each one of the plurality of response fragments to the client, following a reception of the one or more of the plurality of poll requests; and in response to receipt by the client of a transmitted response fragment, removing the response fragment from the server storage.

4. A system comprising:

a processor which executes a JSP server application software;

a memory system which stores the JSP server application software;

a mechanism for connecting to a network having one or a more clients;

a utility having code that executes on the processor and causes the processor to:

define a number of custom java classes within a class library, wherein said classes allow an asynchronous processing of a number of requests for dynamic web content;

receive at the application server, from a client, one or more requests for a dynamic web content;

said application server calling a dispatcher function to handle the asynchronous processing of each associated request dispatcher include fragment;

initiate a separate request thread for each fragment following receipt of the one or more asynchronous requests;

generate a Java Server Page (JSP), comprising one or more "async include" tags that indicate that the JSP represents an asynchronous request for the dynamic web content;

write, to a servlet response buffer, a placeholder corresponding to each JSP having an "async include" tag;

create JavaScript for each placeholder;

send an initial response containing the JavaScript to the client;

terminate an original execution thread;

trigger a number of further processing actions to facilitate the generation of one or more response fragments; and transfer the one or more response fragments to the client in response to receipt from the client of one or more poll requests that are facilitated by the one or more Javascript placeholders, wherein the JavaScript enables the client to retrieve include fragments which replace corresponding placeholders.

5. The system of claim 4, wherein said code that causes the processor to trigger a number of further processing actions further comprises code that causes the processor to:

invoke an "async:include" action, corresponding to the "async:include" tag, which provides an "async request dispatcher" (ARD) JSP response wrapper;

in response to implementing the ARD JSP response wrapper, create a "PrintWriter" response object, wherein said "PrintWriter" response object allows a number of response fragments to be written directly to the ARD JSP response wrapper;

initiate a response thread for the one or more "async include" requests corresponding to each one of a plurality of "async include" tags of the JSP, with an aid of one or more asynchronous beans, which asynchronous beans facilitate the propagation of a number of request contexts, wherein said contexts include one or more of, but is not exclusively limited to: (1) a security context; (2) a naming context; and (3) connection context;

register a content of each one of a plurality of "async include" requests with a application server storage system;

activate a translation of the JSP to a Java servlet;

prompt the execution of the generated Java servlet; and write to the JSP buffer an HTML content, including a number of placeholders respectively corresponding to a number of "async include" requests, and a number of javascripts respectively corresponding to a number of "async include" requests, wherein said JSP buffer writes to a servlet response buffer; and wherein the code that causes the processor to terminate includes an original execution thread comprises code that causes the processor to close the request thread.

6. The system of claim 1, wherein said code that causes the processor to transfer one or more response fragments to the client further comprises code that causes the processor to:

receive one or more poll requests from the client, wherein said one or more poll requests indicate that the client is ready to receive one or more of a plurality of response fragments returned by the response thread, wherein said one or more poll requests are based on one of the following:

(1) a poll request to a controller of a server storage service, wherein said poll request is received, at a regular interval, until a response fragment is available; and (2) an asynchronous input-output (AIO) mechanism, wherein said AIO mechanism facilitates the transmission of a single poll request for a corresponding response fragment, wherein said AIO mechanism keeps said single poll request open until the corresponding response fragment is available;

in response to each one of a plurality of response fragments being available, submitting each one of the plurality of response fragments to the client, following a reception of the one or more of the plurality of poll requests; and in response to receipt by the client of a transmitted response fragment, removing the response fragment from the server storage.

7. A computer program product comprising:

a tangible computer readable storage medium; and program code stored on said tangible computer readable storage medium that when executed within a server computer system, said program code provides the functionality of:

defining a number of custom java classes within a class library, wherein said classes allow an asynchronous processing of a number of requests for dynamic web content;

receiving at the application server, from a client, one or more requests for a dynamic web content;

said application server calling a dispatcher function to handle the asynchronous processing of each associated request dispatcher include fragment;

initiating a separate request thread for each fragment following receipt of the one or more asynchronous requests;

generating a Java Server Page (JSP) comprising one or more "async include" tags that indicate that the JSP represents an asynchronous request for the dynamic web content;

writing, to a servlet response buffer, a placeholder corresponding to each JSP having an "async include" tag;

creating JavaScript for each placeholder;

sending an initial response containing the JavaScript to the client;

terminating an original execution thread;

triggering a number of further processing actions to facilitate the generation of one or more response fragments; and transferring the one or more response fragments to the client in response to receipt from the client of one or more poll requests that are facilitated by the one or more JavaScript placeholders, wherein the JavaScript enables the client to retrieve include fragments which replace corresponding placeholders.

8. The computer program product of claim 7, wherein said code for triggering a number of further processing actions further comprises code for:

invoking an "async:include" action, corresponding to the "async:include" tag, which provides an "async request dispatcher" (ARD) JSP response wrapper;

in response to implementing the ARD JSP response wrapper, creating a "PrintWriter" response object, wherein said response object allows a number of response fragments to be written directly to the ARD JSP response wrapper;

initiating a response thread for the one or more "async include" requests corresponding to each one of a plurality of "async include" tags of the JSP, with an aid of one or more asynchronous beans, which asynchronous beans facilitate the propagation of a number of request contexts, wherein said contexts include one or more of, but is not exclusively limited to: (1) a security context; (2) a naming context; and (3) connection context;

registering a content of each one of a plurality of "async include" requests with a application server storage system;

activating a translation of the JSP to a Java servlet;

prompting the execution of the generated Java servlet; and writing to the JSP buffer HTML content, including a number of placeholders respectively corresponding to a number of "async include" requests, and a number of Javascript placeholders corresponding to a number of "async include" requests, wherein said JSP buffer writes to a servlet response buffer; and wherein terminating an original execution thread comprises closing the request thread.

9. The computer program product of claim 7, wherein said code for transferring one or more response fragments to the client further comprises code for:

receiving one or more poll requests from the client, wherein said one or more poll requests indicate that the client is ready to receive one or more of a plurality of response fragments returned by the response thread, wherein said one or more poll requests are based on one of the following:

(1) a poll request to a controller of a server storage service, wherein said poll request is received, at a regular interval, until a response fragment is available; and (2) an asynchronous input-output (AIO) mechanism, wherein said AIO mechanism facilitates the transmission of a single poll request for a corresponding response fragment, wherein said AIO mechanism keeps said single poll request open until the corresponding response fragment is available;

in response to each one of a plurality of response fragments being available, submitting each one of the plurality of response fragments to the client, following a reception of the one or more of the plurality of poll requests; and in response to receipt by the client of a transmitted response fragment, removing the response fragment from the server storage.

\* \* \* \* \*